March 29, 1938.    A. PFAU    2,112,251
CONTROL SYSTEM
Filed Sept. 30, 1935    4 Sheets-Sheet 3

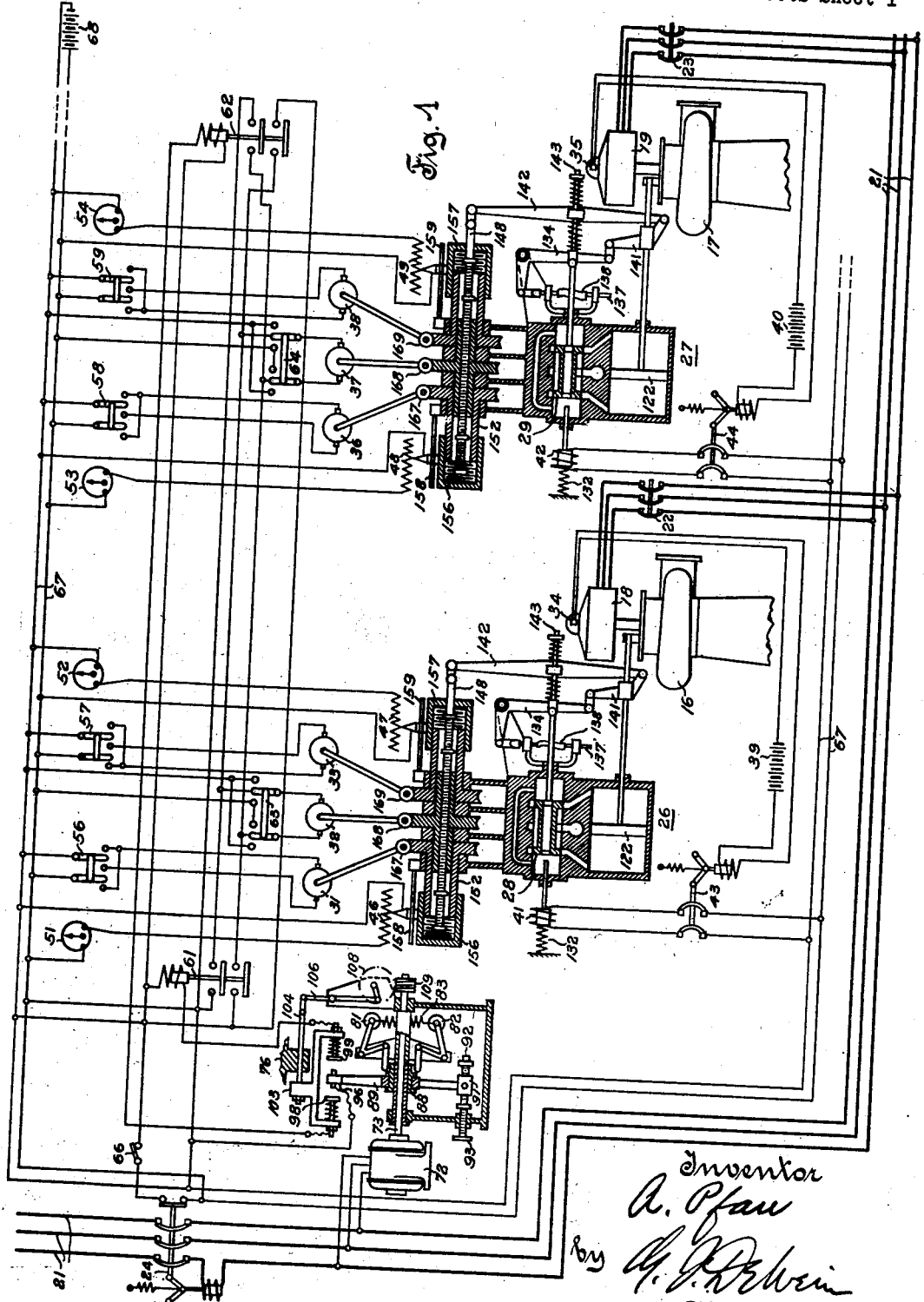

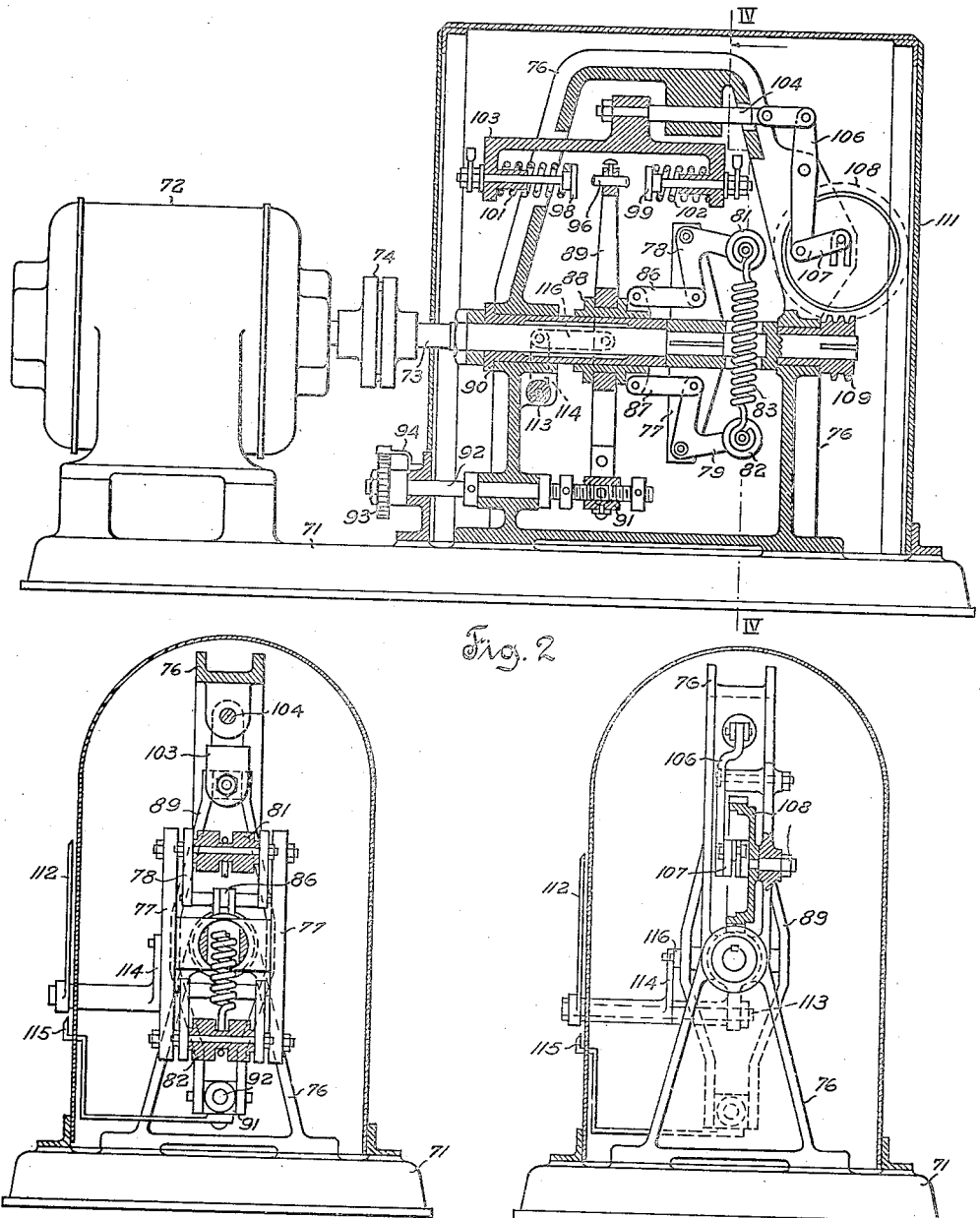

Inventor
A. Pfau
by G. F. Elvin
Attorney

March 29, 1938.  A. PFAU  2,112,251
CONTROL SYSTEM
Filed Sept. 30, 1935  4 Sheets-Sheet 4
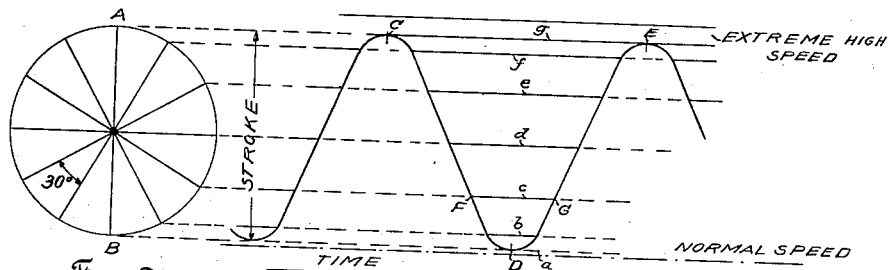
Fig. 9
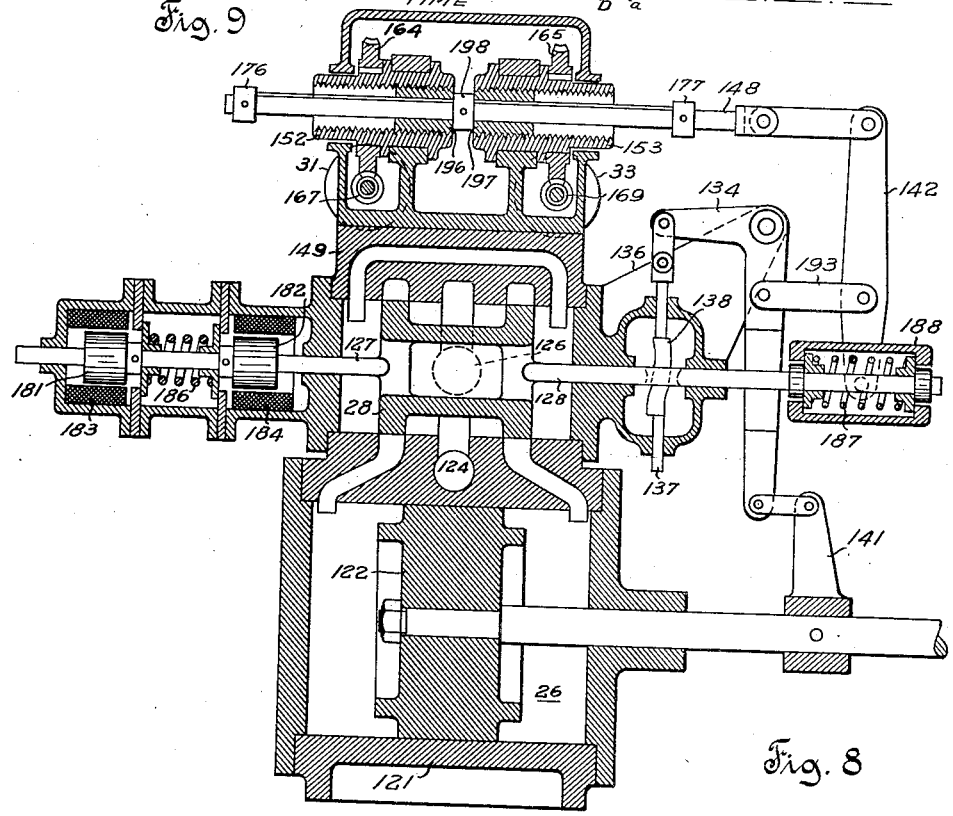
Fig. 8
Fig. 10
Inventor
A. Pfau
by
Attorney Patented Mar. 29, 1938

2,112,251

UNITED STATES PATENT OFFICE 2,112,251

CONTROL SYSTEM

Arnold Pfau, Milwaukee, Wis., assignor to Allis-Chalmers Manufacturing Company, Milwaukee, Wis., a corporation of Delaware Application September 30, 1935, Serial No. 42,834

17 Claims. (Cl. 290—4)

This invention relates to improvements in control systems for prime movers and particularly to constructions and systems for operating a plurality of prime movers from a single means responsive to the speed of such prime movers.

Systems in which large amounts of power are produced generally require a plurality of prime mover units or at least, consist of a number of units to which additions of other units are made from time to time. In all power systems it is desirable that the speed of all of the units, or the so-called system speed, be kept approximately constant or that such variations of speed as occur be kept within predetermined limits. Due to the increasing magnitude of such power systems, the magnitude of load variations occurring therein is becoming a decreasingly small percentage of the total load and such load changes as do take place normally are small and gradual variations, rather than large and sudden changes. Is is therefore no longer necessary that all of the plurality of prime movers in a large system be responsive to all of the load variations and such practice is even undesirable because it contributes both to difficulties in operating the system and to system instability. It is, however, desired that means be provided by which a sufficient number of such units may be controlled, within their most efficient limits of operation, as will be adequate to maintain the power values in the system at the desired point regardless of load variations on the system. Such control means preferably employ only a single highly sensitive speed responsive device for controlling all of the units which need to be controlled. The control means operated by such speed responsive device must then be of such character as to avoid the use of the speed responsive device as a source of power for control purposes and the control must be responsive even to the slightest variation in system speed. Each of the control means must be immediately responsive to any variation, however slight, in the system speed and must also be operable individually to allow normal operation of each unit alone or in parallel with other units, and must be provided with means to meet abnormalities or emergencies arising in operation of any one of the units without disturbance of operation of any of the other units controlled by the same speed responsive device.

It is therefore among the objects of the present invention to provide a control system for prime movers in which a single speed responsive device provides only the control impulses necessary to actuate the individual regulating devices of a plurality of units.

Another object of the invention is to provide a control system for a plurality of prime movers connected into a single system in which each of a plurality of commonly controlled prime movers is provided with individual means controlling regulation of each unit within the maximum and the minimum load limits determined to be most effective for each one of the units.

Another object of the invention is to provide a control system for a plurality of prime movers connected into a single system in which each of a plurality of units is controlled in common by a single speed responsive device and which may be voluntarily adjusted or continuously controlled without disturbing operation of the portions of the control system common to all of the units.

Another object of the invention is to provide a control system for a plurality of prime movers controlled in common and connected into a single system in which emergency condition responsive devices applied to each unit may operate to supersede the common control of any unit affected without affecting the control of other units by the common regulating system.

Another object of the invention is to provide a control system for a plurality of prime movers connected into a single system in which a speed responsive device controls energization of the several control means for periods of time which are variable dependent on the amount of speed change in the system.

Objects and advantages other than those above set forth will be apparent from the following description when read in connection with the accompanying drawings, in which:

Fig. 1 is a diagrammatic representation of the present invention illustrating particularly the electric circuits and so much of the mechanical construction as is necessary to a complete comprehension of the operation of a system embodying the invention;

Fig. 2 is a vertical sectional view, taken on an axial plane, of a speed responsive device herein termed the master controller which controls or governs a plurality of other means by which the speed of any machines to which such means are applied, may be controlled;

Fig. 3 is an end view, looking in the direction of the arrows in Fig. 2, of the master controller with parts thereof, which are already illustrated in Fig. 2, omitted for the sake of clearness in disclosure;

Fig. 4 is a vertical cross sectional view of the master controller taken on the plane IV—IV of Fig. 2;

Fig. 8 is a vertical sectional view similar to that shown in Fig. 5 but illustrating a modified form of means for operating the control valve of a machine to be regulated;

Fig. 9 is a diagram illustrating the operation of the master controller and showing the operation of the contacts thereof plotted on axes of contact stroke and time; and Fig. 10 illustrates the variation in load obtainable with a predetermined setting of load limit devices to secure operation of any of the units within its most efficient range.

Figure 5:
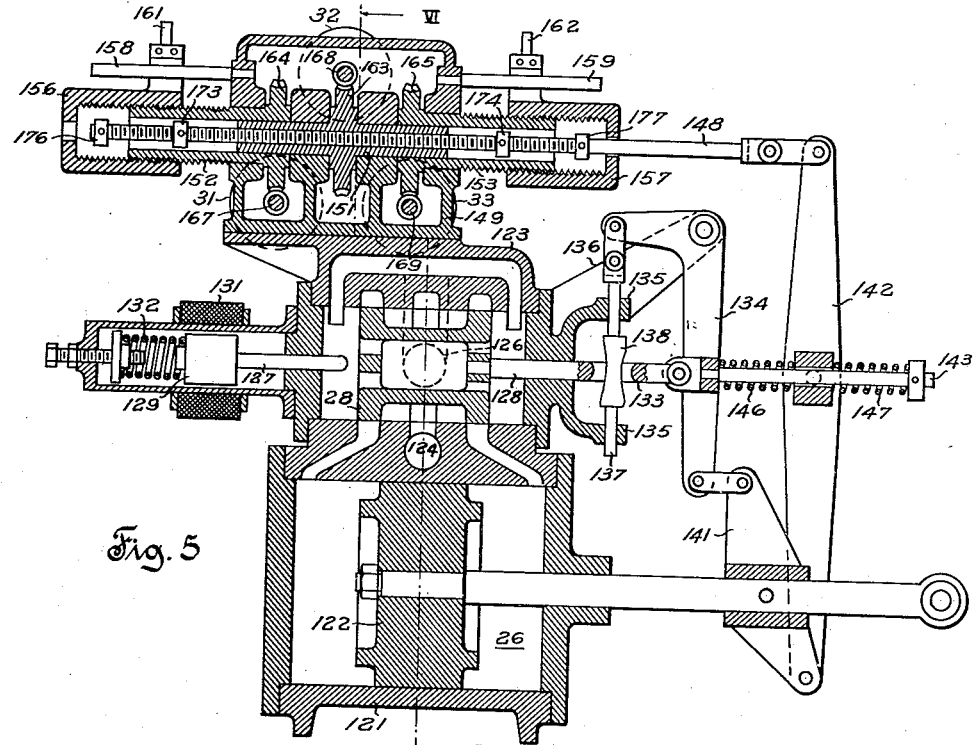
Fig. 5 is a vertical sectional view taken on an axial plane through means for individually controlling a machine and which means in itself is controlled by the master controller.

Referring more particularly to the drawings by characters of reference, reference numerals 16 and 17 designate prime movers herein shown as hydraulic turbines, which prime movers may, however, be of any character operable by a fluid of which the flow is controlled to vary the operation of such prime movers. The hydraulic turbines shown are illustrated as being of the type to which water is supplied by penstocks (not shown) through a spiral casing under the control of one of the usual types of gates which are also not shown. The prime movers 16 and 17 are shown as severally driving energy translating devices 18 and 19, herein shown as electric current generators which are severally connected with an electric power transmission line 21. Connection of the several prime mover generating units to line 21 in parallel with other units is individually controlled by circuit breakers 22 and 23 and connection of all adjacent units to other groups of units in the system is controlled by a circuit breaker 24.

The gates of the prime movers 16 and 17 are severally operated by servomotors 26 and 27 which are shown as being of the fluid pressure operated type supplied with fluid under pressure from the usual oil pressure lubricating systems for the respective prime mover generator units or from any other suitable source. The flow of fluid pressure to the servomotors is severally controlled by valves 28 and 29. The valves are controlled by the cooperation of a plurality of electric motors 31, 32 and 33 acting on the valve 28, and a plurality of electric motors 36, 37 and 38 acting on the valve 29, and also by solenoids 41 and 42 acting directly on the servomotors 26 and 27 respectively. The several connections of the solenoids 41 and 42 with sources of electric energy such as a battery 68 are controlled by circuit breakers 43 and 44, respectively, which are automatically energized in response to some abnormal conditions of the prime mover generator unit such as abnormal temperature of the energy translating devices 18 and 19 which temperature closes the contacts of devices such as thermal relays indicated at 34 and 35. The means by which power is transmitted from the servomotors to the valves and the interconnection of such means with the valves and with the servomotors will be explained in detail hereinafter in connection with the description of the construction of the servomotors and the valves.

Movement of the valves 28 and 29 may be remotely indicated by insertion and withdrawal of portions of resistances 46, 47, 48 and 49 from the several circuits controlling indicating instruments 51, 52, 53 and 54, respectively, to indicate the movement of such valves. The motors 31 and 33 are controlled by the operation of double pole switches 56 and 57 and motors 36 and 38 are controlled by operation of double pole switches 58 and 59. A plurality of relays 61 and 62 are interconnected with motors 32 and 37 and control the operation of such motors, except as explained immediately below, while energization of the relays is controlled by speed responsive means which will be hereinafter designated as the master controller and which will be described in detail. The motors 32 and 37 are severally controllable by switches 63 and 64, respectively, by which the motors may be energized individually for rotation in either direction regardless of whether or not the master controller is in operation and whether or not the relays 61 and 62 are energized through switch 66 from the so-called house or auxiliary line 67 which is energized from the battery 68. The several motors, indicating instruments, relays and solenoids are energized from the house line 67 and are connected and disconnected by the joint action of back contacts on the circuit breaker 24 and by operation of the manually operable switch 66. The master controller, of course, cooperates with the several double pole switches and the relays to control energization of all of the valve operating motors.

The detailed construction of the device herein termed the master controller may be best understood by reference to Figs. 2, 3 and 4 in which a base plate 71 has mounted thereon a motor 72 which is of the synchronous and preferably of the high speed type. The motor is connected with the power line 21 and accordingly is responsive to changes in the electrical values in such line which are responsive to the speed of the prime mover generating units connected therewith. The shaft of motor 72 is coupled with a spindle 73 by a coupling 74 which is preferably of such character as to permit some axial movement of the motor 72 without allowing such movement of the spindle 73 and as to prevent delay in transmission of torque between the shafts. The spindle 73 is suitably supported in a frame 76 which also provides support for other portions of the controller structure to be described. The spindle has mounted thereon arms or plates 77 forming a yoke on which are mounted bell cranks 78 and 79 which carry weights 81 and 82 connected by a spring 83. The weights, bell cranks and spring form a speed responsive means of the character known as a flyball governor. The several cranks of such governor are severally connected through links 86 and 87 with a sleeve 88 which is axially movable on a stationary sleeve 90 enclosing the spindle 73, upon outward movement of the flyball weights under the action of centrifugal force due to rotation thereof by the motor 72. Contacting surfaces of axially moving sleeve 88 and stationary sleeve 90 thus move spirally relative to each other, which minimizes force required to secure movement between such surfaces. A lever 89 is pivotally mounted on the sleeve 88 for movement thereby and is pivotally connected, at one end thereof, with a nut 91 movable on a threaded spindle 92 and forming a fulcrum for such lever. The position of nut 91 may be varied as desired by rotation of spindle 92 by a hand wheel 93 which is retained in any position into which it is turned, by a locking device 94. The free end of the lever 89 is connected to one conductor of the auxiliary house line 67 and is provided with a contact 96 which may engage with either of two contacts 98 and 99, movably mounted on opposite sides of the contact 96. The contacts 98 and 99 are connected with and control the circuits of the coils of the relays 61 and 62 and are mounted on springs 101 and 102 in insulated relation in a yoke 103, which is supported from a rod 104, reciprocally mounted in frame 76. Rod 104 is connected by a link to a lever 106, mounted on frame 76, with a crank mechanism 107 adjustably connected with a worm wheel 108 also mounted on frame 76 and engaging with a worm 109 mounted on the master controller spindle 73. The whole of the master controller, excepting motor 72, coupling 74 and adjusting hand wheel 73 with lock 94, is enclosed within a casing 111.

The hand adjusting wheel 93 may also be controlled automatically to vary the basic speed at which the master controller operates in response to some condition affecting the operation of the units such as the head or tail water level or such basic speed may be changed according to a predetermined program. Thus, the mechanism designated by reference numerals 12 to 19 inclusive of U. S. Letters Patent No. 1,922,323, issued to Arnold Pfau on August 15, 1933, may be applied to spindle 92 in place of hand wheel 93 to adjust the master controller contact lever 89 dependent on head or tail water level.

It will be apparent to one skilled in the art that other automatic means known to the art may also be applied to the master controller to vary the operation thereof as desired.

The master controller therefore provides means responsive to variations in the frequency of the power line 21 and hence in the speed of the prime mover generating unit for closing and interrupting circuits controlling the operation of the motors 32 and 37, which adjust the position of the valves 28 and 29. Such means comprises the motor 72 and the flyball governor which controls engagement of the contacts 96, 98 and 99 by which the circuits of the valve adjusting motors are controlled. The moment at which contact 96 engages either of the other contacts 98 or 99 can be varied by adjustment of the hand wheel 93, thus changing the normal or basic speed of the units controlled. The speed of operation of the units, that is, the frequency of the generator output, is indicated by a pointer 112 movable over a suitable scale formed on the outside of the master controller housing 111. The pointer is mounted on a shaft 113 which is connected by links 114 and 116 with sleeve 88 so that axial movement of the sleeve causes rotation of the shaft 113 and of pointer 112 over its scale. A second pointer 115 is connected with the nut 91 movable on spindle 92 and moves over a suitable scale on the master controller housing to indicate what changes have been made in the setting of contact 96.

Figures 6, 7:
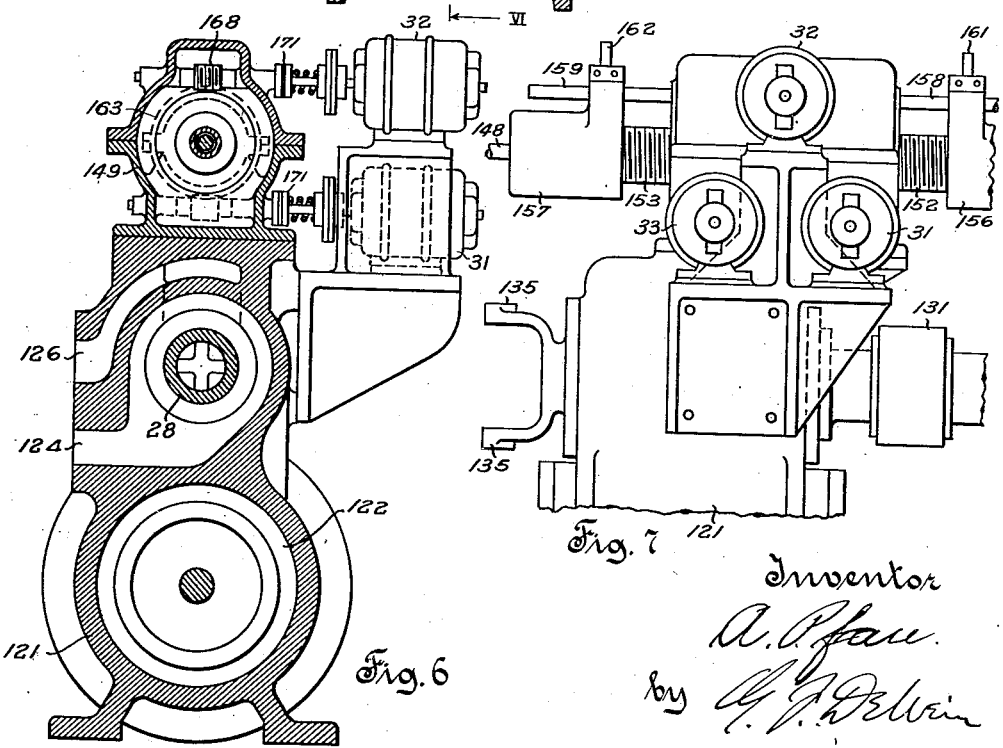
Fig. 6 is a sectional view on plane VI—VI of Fig. 5, looking in the direction of the arrows, and illustrating the operating means for such control valve.
Fig. 7 is a partial rear elevation of Fig. 6, to illustrate the arrangement of the means for operating the control valve shown in Fig. 5.

It will be understood that the servomotors and the valves controlling such servomotors are identical for each of the units controlled, and that such units may be multiplied indefinitely. It is therefore necessary only to describe the structure of the servomotor 26 together with its control valve 28 as illustrated in Figs. 5, 6 and 7. The servomotor 26 comprises a cylinder 121 and a piston 122 reciprocating within the cylinder when fluid pressure is admitted to the cylinder through the valve 28 which is a type of slide valve reciprocating within a valve casing 123 to which fluid pressure is admitted by way of a port 124 and from which the pressure is discharged by way of a port 126. A stem 127 extends through one end of the valve casing and is movable into engagement with the valve as will be explained. The valve 28 is formed with a stem 128 extending through the end of the valve casing. Stem 127 is provided with an enlargement 129 of magnetic material formed thereon to cooperate with a coil 131 formed around such enlargement, the two portions together forming the solenoid generally designated at 41 in Fig. 1. Such solenoid core 129 is biased into one position by the action of an adjustably mounted spring 132 to secure opening operation of the valve upon deenergization of coil 131 as will appear hereinafter. Valve stem 128 is formed with a loop 133 intermediate its ends and is connected at its outer end with a bell crank 134 which has its pivoting point on a bracket 136 extending from the valve casing 123. One end of the bell crank 134 has attached thereto a rod 137 guided in the bosses 135 of bracket 136. The rod 137 has formed thereon a cam 138 movable within the valve stem loop 133 to form a rate of movement limiting device of the character disclosed in U. S. Letters Patent No. 1,839,257, issued to Arnold Pfau on January 5, 1932. The other end of the bell crank 134 is connected by way of a link with an arm 141 mounted on the rod of servomotor piston 122. The arm 141 is also attached to a floating lever 142 having a point intermediate its ends resiliently connected with the bell crank 134 by a rod 143 movably connected with the lever 142 and operating against the action of springs 146 and 147. The other end of the floating lever 142 is connected with a screw threaded rod 148 which extends into a casing 149 and through a sleeve 151 centrally located within the casing. Externally threaded sleeves 152 and 153 are mounted in and extend from the ends of the casing and are arranged over the sleeve 151. The ends of the sleeves 152 and 153 are substantially closed by internally threaded caps 156 and 157 respectively, which move longitudinally as the sleeves 152 and 153 are rotated. Such movements of the caps 156 and 157 are guided respectively by rods 158 and 159 extending from the casing 149 and the caps carry contact members 161 and 162 respectively to engage with and vary the amount of resistances 46 and 47 in circuit with the indicating instruments 51 and 52. A worm wheel 163 is secured on or formed as a part of the inner sleeve 151 and worm wheels 164 and 165 are likewise mounted on or formed as portions of sleeves 152 and 153 respectively. The worm wheels severally engage worms 167, 168 and 169 which are supported in and extend through the valve drive casing 149. Such worms are respectively connected with the spindles of motors 31, 32 and 33 by means of suitable slip or overrunning clutches as indicated at 171. The movement of rod 148 by motor 32 is limited by the position of collars 173 and 174 and the movement of such rod by motors 31 and 33 is also limited by the position of collars 176 and 177. The individual functions of the several portions of the structure described will be apparent from the explanation of the operation of the system hereinafter.

A modified structure of the control valve and of the drive heretofore described, is shown in Fig. 8 which differs from the structure shown in Figs. 5, 6 and 7 in that the single solenoid 129, 131 is now replaced by a plurality of solenoids comprising the cores 181 and 182 associated respectively with coils 183 and 184 to form a double solenoid acting against a spring 186 and replacing the motor 32 of the embodiment previously described. The functions of motor 32 in operating the valve shown in Figs. 5, 6 and 7 are now performed by the double solenoid. The one end of floating lever 142 is now no longer connected with the arm 141 on the rod of the servomotor piston 122, but is connected directly with the valve stem 128 through a resilient connection comprising a spring 187 mounted on the stem 128 and arranged within a spring casing 188 mounted on the end of the lever 142. Bell crank 134 and the center portion of floating lever 142 are now connected directly by a link 193. The mechanism for reciprocating rod 148 by means of motors 31 and 33 is also somewhat modified from that previously shown in that sleeve 151 is now replaced by two sleeves, 196 and 197, and that collars 173 and 174 are replaced by a single collar 198 mounted on rod 148 between the sleeves 196 and 197. The sleeves 152 and 153 remain substantially as previously shown and the drives of the motor 31 and the motor 33 likewise remain the same.

The operation of the master controller and of the several control valves can be best understood by considering the several conditions under which the system must operate. As shown, the system is presumed to be in operation at normal speed and hence the several prime mover generating units are presumed to be delivering current at the frequency of the transmission line 21 over the circuit breakers 22 and 23. Circuit breaker 24 is closed and is kept in the closed position. To simplify explanation of the operation of the system, the operation of one unit will be described, the operation of other units being similar thereto. Operating fluid is then being supplied to the prime mover 16 and the gate or valve therein is in a predetermined position in which it is retained by the balanced pressure on opposite sides of the piston of servomotor 26. Valve 28 is then in the neutral position to avoid application of fluid pressure to either side of the servomotor piston. As long as the contacts of thermal relay 34 remain open, the circuit of the battery 39 is interrupted and the solenoid operating means of switch 43 remains unenergized. The coil of solenoid 41 therefore remains energized and the spring 132 is retained under compression to allow free movement of the valve 28 in any direction. It will be understood that overheating of the generator will cause closing of the contacts of the thermal relay 34 which closes the circuit of the battery 39 to the switch 43 to open the switch. Spring 132 then expands to push the valve 28 toward the right to cause closing movement of the prime mover generating valve as will be described.

The electric current flowing in the line 21 drives synchronous motor 72 which rotates flyballs 81 and 82 to cause shifting of the sleeve 88 and positioning of the contact arm 96 dependent on the speed of the prime mover generator unit and hence on the frequency of the electric current supplied to the line. Rotation of the motor 72 also drives the worm 109 and worm wheel 108 which reciprocates rod 104, the stroke of the rod 104 being dependent on the lever arm length of the crank 107. Contacts 98 and 99 are reciprocated at a rate of speed determined wholly by the ratio of the worm and worm wheel 109 and 108. Crank 107 is however, so adjusted that, at normal frequency, contact 96 remains just out of contact with the contacts 98 and 99 at the ends of their respective strokes. Even though the auxiliary contacts of the circuit breaker 24 and the manually operable switch 64 are closed to complete energization of line 67, the circuits of relays 61 and 62 remain open, and motors 32 and 37 remain unenergized and valves 28 and 29 remain in the neutral position shown retaining the gates of the prime movers in the then attained position. Manually operable switches 56 and 57 control the maximum and minimum load limiting motors 31 and 32 and are not closed and valve 28 is therefore not influenced by any movement of such motors.

If a small speed change takes place, such as a speed increase, motor 72 operates at a higher speed, the weights 81 and 82 move farther away from the spindle 73 and the contact arm 89 is moved over fulcrum 91 in a clockwise direction. Such movement causes contacts 96 and 99 to engage at the left hand end of the stroke of the contact yoke 103, the length of time of contact engagement depending on the amount of speed change which has taken place as will be explained below. An electric impulse is thus transmitted to relay 61 which momentarily closes its contacts to energize motor 32 which shifts valve 28 to the right by movement of lever 142 until the loop 133 strikes the left surface of cam 138 thereby preventing further movement of valve 28 and compressing spring 146 thus limiting fluid pressure flow, to a predetermined rate, to the right hand side of servomotor 26 to cause movement of the prime mover gate in the closing direction at a rate determined by the curvature of the cam face. Such movement of the gate and of the piston of servomotor 28 moves the floating lever 142 and relays such movement to the valve 28 to restore the valve to its neutral position. If the degree of closing of the prime mover gate or valve, in response to the actions above described, has been sufficient to reduce the speed and hence the frequency to the desired value, the speed of the motor 72 decreases, thereby decreasing the distance at which flyballs 81 and 82 are rotated away from the spindle 73 and moving the contact arm 89 in a counterclockwise direction to the position previously occupied thereby. Contacts 96 and 99 are then out of engagement and the circuit to the coil of the relay 61 is interrupted whereupon the relay opens the circuit to the motor 32. Valve 28 being now in the neutral position, the position of the servomotor 26 is fixed at the point then attained until a further speed change occurs.

If the speed continues to increase, the above cycle of operations is repeated at an increasing rate dependent on the amount of frequency change in the system which amount of change controls the duration of contacting engagement of the contacts 96 and 99. Such contacting may become a continuous engagement which will then cause motor 32 to continue to rotate, thus continuing to move lever 142 to the right which tends to cause continuous right hand movement of the valve 28 and of the servomotor piston and thus such movement would neutralize the relaying or restoring action of the lever 142 on the valve 28. Due to the limited possible stroke of the valve 28, constant rotation of the motor 32 requires slipping of the clutch 171 and the motor thus merely holds the valve 28 in its extreme right hand position. Continuous rotation of the motor 32 as a result of continuing increase of speed causes continuous rotation of sleeve 151 which continues to move rod 148 to the right. Such movement of the rod is, however, limited by the position of the limiting collar 177 on such rod, which can move only until the collar 177 comes in contact with the end cap 157. The position of end cap 157 thus limits the degree to which the prime mover generating gate or valve may close and thus limits the minimum load under which the prime mover generating unit may operate, to a predetermined value. Such value is set by movement of switch 57 to cause motor 35 to rotate which rotates sleeve 153 to cause movement of the end cap 157 axially of the rod 148 either toward or away from the end of the sleeve 151 which is stationary. The sleeve 153 may be rotated in either direction merely by changing the position of switch 57 and, once the desired position is reached, sleeve 153 is allowed to remain in its then attained position by interruption of the circuit to the motor 35 by movement of switch 57 into its neutral position.

If a gradual speed decrease from the predetermined value should take place, the cycle of governing operations would be similar to those above described but would be opposite in sense and would require the use of the maximum load limit device. For momentary speed decreases, the speed of the motor 72 then decreasing, flyballs 81 and 82 contract to rock the contact arm 89 toward the contact 98 which momentarily engages with the contact 96. A circuit is thus momentarily completed to the coil of the relay 62 which lifts the relay to complete the circuit to the motors 32 and 37. Again considering only operation of the motor 32, the circuit now completed thereto is such as will cause the motor to rotate sleeve 151 to move the rod 148 toward the left thereby rocking lever 142 in a counterclockwise direction to move the valve 28 to the left. Such movement of the valve admits fluid pressure to the left hand face of the piston of servomotor 26 which moves the prime mover control valve in the opening direction. The relaying of the movement of the servomotor piston and the limiting of the rate of restoration of the valve 20 now takes place in a similar manner to that described above, but in the opposite sense and such description need not therefore be repeated.

If the degree of gate operation which has taken place has been sufficient to raise the speed to its predetermined normal value, the master controller contact lever 89 is returned to its previous position out of range of the stroke of contact 98 and no further action takes place. However, if the speed decrease is large and continuous, contacts 96 and 98 are continuously engaged and motor 32 continues to move lever 142 to the left to keep the valve 28 in the left hand position which continues to supply fluid pressure to the left side of the piston of servomotor 26 to move the prime mover unit gate in the opening direction. Such continuous movement of the lever 142 to the left cancels the relaying action of the lever and the valve 28 remains in its extreme left hand position as determined by contact of the right hand face of cam 138 with loop 133. Continued rotation of the motor 32, continues movement of the rod 148 to the left until the collar 176 engages the end cap 156 whereupon clutch 171 slips to avoid stalling of the motor 32. As soon as movement of the rod 148 toward the left has been stopped by the end cap 156, continued movement of the piston of the servomotor 26 in the gate opening direction results in reversal of the direction of movement of lever 142 which now restores valve 28 to the neutral position. Further movement of the piston of servomotor 26 then ceases and the gate remains in the position then attained. The position of the end cap 156 thus limits the maximum load which may be put on the prime mover generating unit 16, 18. The position of the end cap 156 may, of course, be varied in a manner similar to that described for the positioning of end cap 157 and which description need not therefore be repeated.

If the frequency of line 21 and hence the speed of the prime cover generating unit should change by a large amount, the cycles of action above described would be repeated dependent only on the amount of such speed change and hence on the duration of contacting engagement of contact 96 with contact 98 or 99. Such duration would be continuous as soon as contact arm 89 is moved in either direction more than one-half of the stroke of the contact yoke 103.

If it is desired to interrupt operation of the units controlled by the same master controller, it is necessary to turn hand wheel 93 in a direction to rock the contact arm 89 to bring contact 96 continuously into engagement with contact 99 which causes motor 32 to move lever 142 to the right, thereby causing valve 28 to move towards the right to admit fluid pressure on the right hand face of the piston of servomotor 26. Motor 37 then causes a similar movement of the piston of servomotor 27 and both servomotors 26 and 27 continue such movement while switches 57 and 59 are closed to the position to cause motors 33 and 38 respectively to move the minimum load limiting end cap 157 and the end cap controlled by movement of the motor 38 respectively in such direction as to permit the motors 32 and 37 to keep the valves 28 and 29 in the extreme right hand position to retain servomotors 26 and 27 moving into the gate closing position. When such gates are about closed, circuit breaker 24 will be opened to disconnect the prime mover generating unit from the transmission line 21. Circuit breakers 22 and 23 are then opened and the portion of the system shown is entirely at rest. After the system is at rest, control arm 89 and the minimum load limiting device should again be returned to their previous position to place the system in readiness for starting and for connection with the transmission line 21.

When it is desired to start the system, assuming that the gates of the several prime mover generating units are closed, that the servomotors 26 and 27 are in their extreme left hand position, that the valves 28 and 29 are in their neutral position, that contact arm 89 is in the predetermined position for the frequency desired, that circuit breaker 24 is opened and that motor 72 is not operating, switches 63 and 64 are in the position shown and switch 66 is open thus interrupting any circuit to relays 61 and 62 from the master controller. Switches 63 and 64 are then shifted to connect motors 32 and 37 to the auxiliary line 67 in a direction to move valves 28 and 29 toward the left to admit fluid pressure to the servomotors 26 and 27 to move the pistons thereof toward the right and thus to open the gates of the several prime mover generating units. The units thus come up to speed and are connected with the transmission line 21 when the output of such units is in synchronism with the line. Such synchronizing means are well known to the art and are therefore not described herein. As soon as the units are connected to the line, switches 63 and 64 are returned to the positions shown and switch 66 is closed. The minimum limiting devices having been previously moved to their previous setting and the master controller now being in operation, regulating operation of the unit takes place as previously described.

It will be apparent to those skilled in the art that the several units may be individually started by use of the switches 63 and 64, regardless of operation of the master controller. Any one of the units may likewise be individually stopped by movement of switches 63 and 64 out of the position shown, thus interrupting the circuit to the motors 32 and 37, which are controlled by the relays 61 and 62.

The manner of operation of the master controller is illustrated in a diagrammatic way in Fig. 9, in which a diameter A, B of the circle designates the total stroke of the yoke 103 and of the reciprocating contacts 98 and 99 and the periodic movement of such contacts is substantially illustrated by the sine curve C, D, E. Such curve is drawn with respect to an axis B, D of time abscissas, the ordinates of the points of the curve C, D, E representing the distance between contact 98, for example, and the end of the stroke thereof nearest to contact 96. The intersection of the branches C, D and D, E of the curve C, D, E with any straight line parallel to the axis B, D then defines segments such as $c$ of the length F, G, the length of such segments representing the length of time that contact 98 remains distant from the predetermined setting of contact 96 by less than the value of the ordinate D, $c$ of the segment. Thus, if contact 96 departs from the predetermined setting thereof by an amount equal to the ordinate D, $c$ of segment $c$, such contact 96 and contact 98 will remain in engagement during a length of time F, G. During such engagement, the contacts 96 and 98 are stationary while the yoke 103 continues to follow the curve C, D, E with the effect only of causing variable compression of the spring 101. When the speed of the motor 72 is the speed desired therefore as determined by adjustment of the wheel 83, contact 96 is in the predetermined position thereof represented by the ordinate of the line titled "normal speed" in Fig. 9. Contact 96 then does not engage with either the contact 98 or the contact 99 during any rotation of the crank 107. When the speed of the prime mover units 16, 18 and 17, 19 changes from the predetermined value, the flyball weights 81 and 82 displace contact 96 from its previous position by an amount dependent on the speed change of spindle 73. Such displacement of contact 96 causes contacts 98 or 99 to come into engagement therewith, depending on the sense of the speed change which has occurred, during each revolution of the crank 107 for a predetermined length of time depending on the amount of displacement of the contact 96 which varies from zero when the contact 96 reaches a position represented by the ordinate of the axis B, D to continuous engagement when the contact 96 reaches the position represented by the ordinate D, $g$.

The curves shown in Fig. 10 illustrate the operation of the maximum and minimum load limit devices. Curve H is a curve plotted on ordinates of percentage of efficiency of, for example, the prime mover unit 16, 18 and on abscissas of the stroke of the servomotor 26 in tenths to illustrate the limit of gate opening to secure operation of the unit within its most efficient range and curve I is plotted on ordinates of horsepower output in tenths of a horsepower and on abscissas of stroke of the servomotor to illustrate the possible variations of the load within the range of control permitted by a predetermined setting of the maximum and minimum load limiting devices. It will be seen that, for an efficiency range of plus or minus 2½%, the output may be varied from .71 to .98 of full horsepower to allow the unit to take up or reject such load changes within the set range of the load limiting devices, or to assume any intermediate gate position due to the absence of any direct relaying connection between the several units and the positions provide variations in the outputs of the individual units which do not, however, disturb operation of the system because such variations are only a relatively small portion of the total output of the system. It will therefore of course be understood that the control range may be increased by proper setting of the load limit as desired to include a wider efficiency range and that the amount of load regulation possible by such unit will then be correspondingly increased.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A governor for an electrically controllable prime mover comprising means driven at high speed and operating responsive to changes of speed in the prime mover, flyballs mounted to be driven by said speed responsive means, a contact member adjustably mounted and movable upon variation of the movement of said flyballs, and contacts mounted for reciprocation adjacent said contact member and engaging therewith for periods of time varying dependent on the amount of change in the speed of said prime mover.

2. A governor for an electrically controllable prime mover comprising means operating responsive to changes in the speed of the prime movers, flyballs driven by said speed responsive means, a contact member movable by said flyballs upon variation in the speed of movement thereof, means for adjusting the position of said contact member, contacts mounted for reciprocation into and out of engagement with said contact member, and adjustable means driven by said speed responsive means to cause reciprocation of said contacts.

3. In a system for controlling a plurality of prime movers, a power output line, a plurality of electric generators severally driven by said prime movers and connected with said line for parallel operation, means severally controlling the supply of energy to said prime movers, means directly responsive to an electrical quantity to be regulated to a predetermined value in said line for controlling the operation of all of said energy supply control means, and means for limiting the range of movement of said energy supply control means, said electrical quantity responsive means controlling the operation of said energy supply control means and of said range limiting means.

4. In a system for controlling a plurality of prime movers, a power output line, a plurality of electric generators severally driven by said prime movers and connected with said line for parallel operation, mechanical means severally controlling the supply of energy to said prime movers, electrical means severally controlling the operation of said energy supply control means, means directly responsive to an electrical quantity to be regulated to a predetermined value in said line and actuating a plurality of contacts, and electrical means for limiting the range of movement of said mechanical means, the contacts actuated by said electrical quantity responsive means controlling the energization of all of said electrical means.

5. In a system for controlling a plurality of prime movers, a power output line, a plurality of electric generators severally driven by said prime movers and connected with said line for parallel operation, means severally controlling the supply of energy to said prime movers, a plurality of electric motors controlling the operation of said energy supply control means, a plurality of electric motors for severally limiting the range of movement of said control motors, and means directly responsive to an electrical quantity to be regulated to a predetermined value in said line for controlling the operation of all of said electric motors.

6. In a system for controlling a plurality of prime movers, a power output line, a plurality of electric generators severally driven by said prime movers and connected with said line for parallel operation, means severally controlling the supply of energy to said prime movers, a plurality of electric motors controlling the operation of said energy supply control means, a plurality of electric motors for severally limiting the range of movement of said control motors, a plurality of relays controlling the energization of all of said motors, and a single means directly responsive to an electrical quantity to be regulated to a predetermined value in said line for controlling the energization of all of said relays.

7. In a system for controlling a plurality of prime movers, a power output line, a plurality of electric generators severally driven by said prime movers and connected with said line for parallel operation, means severally controlling the supply of energy to said prime movers, a plurality of electric motors controlling the operation of said energy supply control means, a plurality of electric motors for severally limiting the range of movement of said control means, a plurality of relays controlling the energization of all of said motors, a single means responsive directly to an electrical quantity to be regulated to a predetermined value in said line for controlling the energization of said relays, and a plurality of manually operable switches severally connected in the circuits of said motors and operable to supersede actuation of said motors by said electrical quantity responsive means.

8. In a system for controlling a plurality of prime movers, a power output line, a plurality of electric generators severally driven by said prime movers and connected with said line for parallel operation, means severally controlling the supply of energy to said prime movers, a plurality of electric motors controlling the operation of said energy supply control means, a plurality of electric motors for severally limiting the range of movement of said control motors, means severally operable by said range limiting motors for severally indicating the positions thereof, and means directly responsive to an electrical quantity to be regulated to a predetermined value in said line for controlling the energization of all of said motors.

9. In a system for controlling a plurality of prime movers, a power output line, a plurality of electric generators severally driven by said prime movers and connected with said line for parallel operation, means severally controlling the supply of energy to said prime movers, a plurality of electric motors controlling the operation of said energy supply control means, a plurality of electric motors for severally limiting the range of movement of said control motors, variable resistances individually adjusted by operation of said range limiting motors, indicating instruments severally connected with said resistances and measuring the quantity of resistance in circuit to indicate the several positions of said range limiting motors, and means directly responsive to an electrical quantity to be regulated to a predetermined value in said line for controlling the energization of all of said motors.

10. In a system for controlling a plurality of prime movers, a power output line, a plurality of electric generators severally driven by said prime movers and connected with said line for parallel operation, means severally controlling the supply of energy to said prime movers, means directly responsive to an electrical quantity to be regulated to a predetermined value in said line for controlling the operation of all of said energy supply control means, and means severally responsive to an abnormal condition of said electric generators to supersede operation of said electrical quantity responsive means and to cause individual movement of said energy supply control means in a direction to shut off the energy supply to the several said prime movers driving said electric generator attaining predetermined abnormal conditions.

11. In a system for controlling a plurality of prime movers, a power output line, a plurality of electric generators severally driven by said prime movers and connected with said line for parallel operations, means severally controlling the supply of energy to said prime movers, means directly responsive to an electrical quantity to be regulated to a predetermined value in said line for controlling the operation of all of said energy supply control means, thermal relays located on and responsive to the individual temperatures of said electric generators, and means severally controlled by said relays to supersede operation of said electrical quantity responsive means and to shut off the supply of energy individually to the several said prime movers upon attainment of predetermined temperatures by said electric generators driven thereby.

12. A governor for an electrically controllable prime mover and comprising means driven by the prime mover and responsive to the changes of speed thereof, flyballs driven by said speed responsive means, a contact lever connected with said flyballs for movement thereby upon variation in the speed of operation thereof, an adjustable fulcrum for said lever, and a plurality of contacts reciprocated by said speed responsive means into and out of engagement with said contact lever.

13. A governor for an electrically controllable prime mover and comprising means driven by the prime mover and responsive to the changes of speed thereof, flyballs driven by said speed responsive means, a contact lever connected with said flyballs for movement thereby upon variation in the speed of operation thereof, a plurality of contacts reciprocated by said speed responsive means into and out of contact with said contact lever, a pointer connected with said flyballs, and a scale cooperating with said pointer to indicate the amount and the direction of any speed change.

14. A governor for an electrically controllable prime mover and comprising means driven by the prime mover and responsive to the changes of speed thereof, flyballs driven by said speed responsive means, a contact lever connected with said flyballs for movement thereby upon variation in the speed of operation thereof, an adjustable fulcrum for said lever, a plurality of contacts reciprocable by said speed responsive means into and out of contact with said lever, a pointer connected with said fulcrum, and a scale cooperating with said pointer to indicate any deviation from the predetermined seating of said contact lever.

15. In a system for controlling the supply of energy to a prime mover, a fluid pressure actuated servomotor controlling the supply of energy to the prime mover, a reciprocable valve controlling the application of fluid pressure to said servomotor, a plurality of rotary motors mounted adjacent said valve, said motors being operable from a remote location, and means connecting said valve with one of said motors for converting the rotary motion of said motors into reciprocating motion to operate said valve and connecting said valve with the others of said motors for limiting the reciprocating motion of said valve.

16. In a system for controlling the supply of energy to a prime mover, a fluid pressure actuated servomotor controlling the supply of energy to the prime mover, a reciprocable valve controlling the application of fluid pressure to said servomotor, a plurality of rotary motors mounted adjacent said valve, said motors being operable from a remote location, a screw threaded rod driven by one of said motors and connected with and causing reciprocation of said valve upon rotation of said rod, and a plurality of stop members driven by others of said motors to limit the range of movement of said rod.

17. In a system for controlling the supply of energy to a prime mover, a fluid pressure actuated servomotor controlling the supply of energy to the prime mover, a reciprocable valve controlling the application of fluid pressure to said servomotor, a plurality of rotary motors mounted adjacent said valve, said motors being operable from a remote location, a threaded sleeve mounted for rotation by one of said motors, a threaded rod extending through said sleeve in engagement therewith and connected with said valve to cause reciprocation thereof upon rotation of said rod, a plurality of threaded sleeves mounted on the first said sleeve and severally driven by others of said motors, and a plurality of end caps severally mounted on and in threaded engagement with the second said sleeve to engage the ends of said rod for limiting the range of movement thereof.

ARNOLD PFAU.